(12) United States Patent
Chou

(10) Patent No.: US 7,281,693 B2
(45) Date of Patent: Oct. 16, 2007

(54) BALL HEAD ASSEMBLY WITH ANTI-ESCAPE MECHANISM FOR A TRIPOD

(76) Inventor: Ta-Ching Chou, No. 22, West 4th Alley, 20 Lin, Hsi Ping Li, Hua Hsia Lane, Hsi Tun Dist., Taichung City (TW)

( * ) Notice: Subject to any disclaimer, the term of this patent is extended or adjusted under 35 U.S.C. 154(b) by 105 days.

(21) Appl. No.: 11/319,627

(22) Filed: Dec. 29, 2005

(65) Prior Publication Data

US 2007/0152115 A1    Jul. 5, 2007

(51) Int. Cl.
*F16M 11/02* (2006.01)
(52) U.S. Cl. .............................. 248/181.1; 248/179.1; 248/288.31; 248/483; 403/90; 403/122
(58) Field of Classification Search ............. 248/181.1, 248/481, 482, 483, 484, 181.2, 177.1, 178.1, 248/179.1, 184.1, 187.1, 288.31; 403/90, 403/122, 143
See application file for complete search history.

(56) References Cited

U.S. PATENT DOCUMENTS

| | | | | | |
|---|---|---|---|---|---|
| 1,797,893 A | * | 3/1931 | Zerk | ....................... | 248/181.1 |
| 1,798,446 A | * | 3/1931 | Zerk | ....................... | 248/181.1 |
| 2,670,228 A | * | 2/1954 | Pagliuso | ..................... | 403/137 |
| 4,708,510 A | * | 11/1987 | McConnell et al. | .......... | 403/90 |
| 4,740,804 A | * | 4/1988 | Shands | ....................... | 396/198 |
| 4,974,802 A | * | 12/1990 | Hendren | .................. | 248/181.1 |
| 5,073,417 A | * | 12/1991 | Bowerman | ................... | 428/31 |

* cited by examiner

*Primary Examiner*—Anita M. King
(74) *Attorney, Agent, or Firm*—Rosenberg, Klein & Lee

(57) ABSTRACT

A ball head assembly has a holding base, a clamping collar, a ball, a holder and an anti-escape mechanism. The anti-escape mechanism is mounted on the holding base, is connected to the ball and has a supporting rod, a supporting block, a dragging member and a nut. The supporting rod extends through the bottom of the holding base and has a spherical end rotatably connected to the ball and a threaded end. The supporting block is mounted around the supporting rod and rotatably mates with the bottom of the holding base. The dragging member is mounted around the supporting rod and has a first end abutting against the supporting block and a second end. The nut is screwed onto the threaded end of the supporting rod and abuts against the second end of the dragging member.

11 Claims, 4 Drawing Sheets

BALL HEAD ASSEMBLY WITH ANTI-ESCAPE MECHANISM FOR A TRIPOD

BACKGROUND OF THE INVENTION

1. Field of the Invention

The present invention relates to a ball head assembly, and more particularly to a ball head assembly for a tripod and having an anti-escape mechanism.

2. Description of Related Art

A tripod is used to support a precision instrument such as a camera, a video camera or a telescope on the ground to keep a user free from having to hold the camera. To allow the user to adjust a horizontal level of the camera, a conventional tripod sometimes has a ball head assembly adjustably mounted on the tripod and used to support the camera.

However, when the horizontal level of the camera is adjusted, the conventional ball head assembly, even with a friction adjusting design cannot effectively hold the camera and easily flops down due to the weight of the camera. When the ball head assembly with the camera flops down unintentionally, the camera is easily damaged, in addition to the danger of fingers of the user being pinched. To keep the unlocked ball head assembly from flopping down, the user must hold the camera at all times of adjusting the ball assembly. Therefore, to adjust an unlocked conventional ball head assembly is troublesome and risky concerning a precision instrument mounted on the tripod.

To overcome the shortcomings, the present invention tends to provide a ball head assembly for a tripod to mitigate or obviate the aforementioned problems.

SUMMARY OF THE INVENTION

The main objective of the invention is to provide a ball head assembly with an anti-escape mechanism to keep an unlocked ball from unintentionally flopping down. The ball head assembly has a holding base, a clamping collar, a ball, a holder and an anti-escape mechanism. The holding base has a top and a bottom. The clamping collar is attached to the holding base. The ball is rotatably attached to the clamping collar and has a top and a bottom. The holder is attached to the top of the ball to hold a camera on the holder. The anti-escape mechanism is mounted on the holding base, is connected to the ball and has a supporting rod, a supporting block, a dragging member and a nut. The supporting rod extends through the bottom of the holding base and has a spherical end rotatably connected to the bottom of the ball and a threaded end extending out from the bottom of the holding base. The supporting block is mounted around the supporting rod and rotatably mates with the bottom of the holding base. The dragging member is mounted around the supporting rod and has a first end abutting against the supporting block, and a second end. The nut is screwed onto the threaded end of the supporting rod and abuts against the second end of the dragging member.

Other objects, advantages and novel features of the invention will become more apparent from the following detailed description when taken in conjunction with the accompanying drawings.

DETAILED DESCRIPTION OF PREFERRED EMBODIMENT

Figure 1:
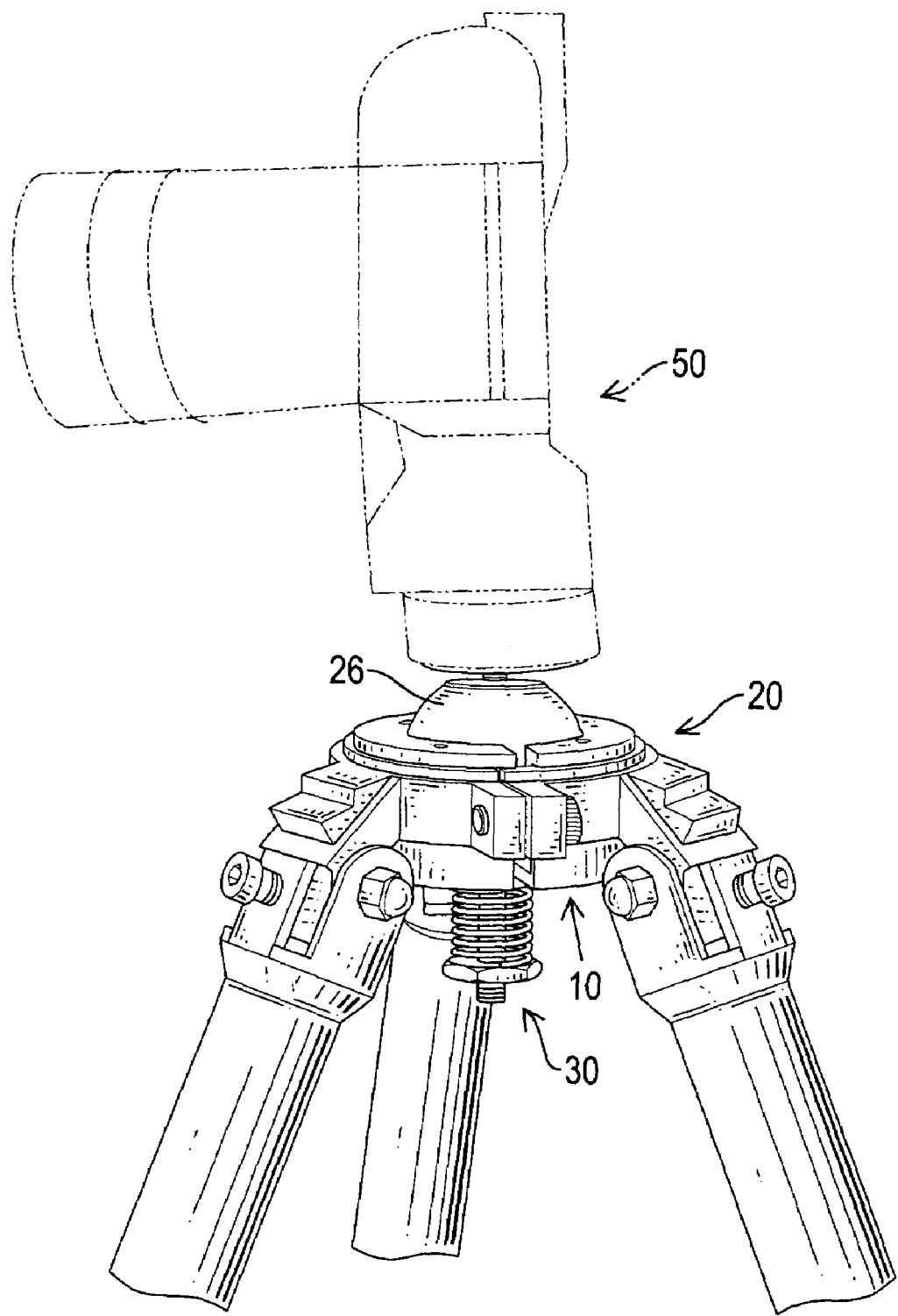
FIG. 1 is a perspective view of a tripod with a ball head assembly in accordance with the present invention.
Figure 2:
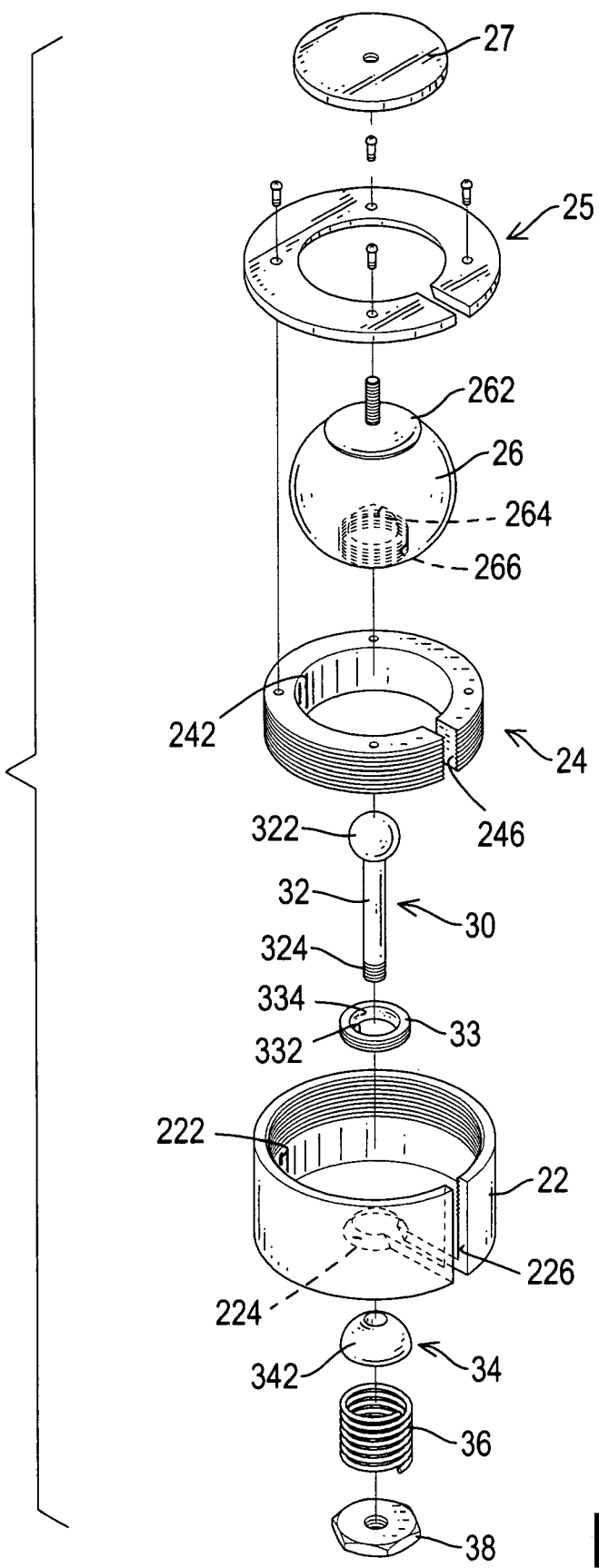
FIG. 2 is an exploded perspective view of the ball head assembly in FIG. 1.
Figure 3:
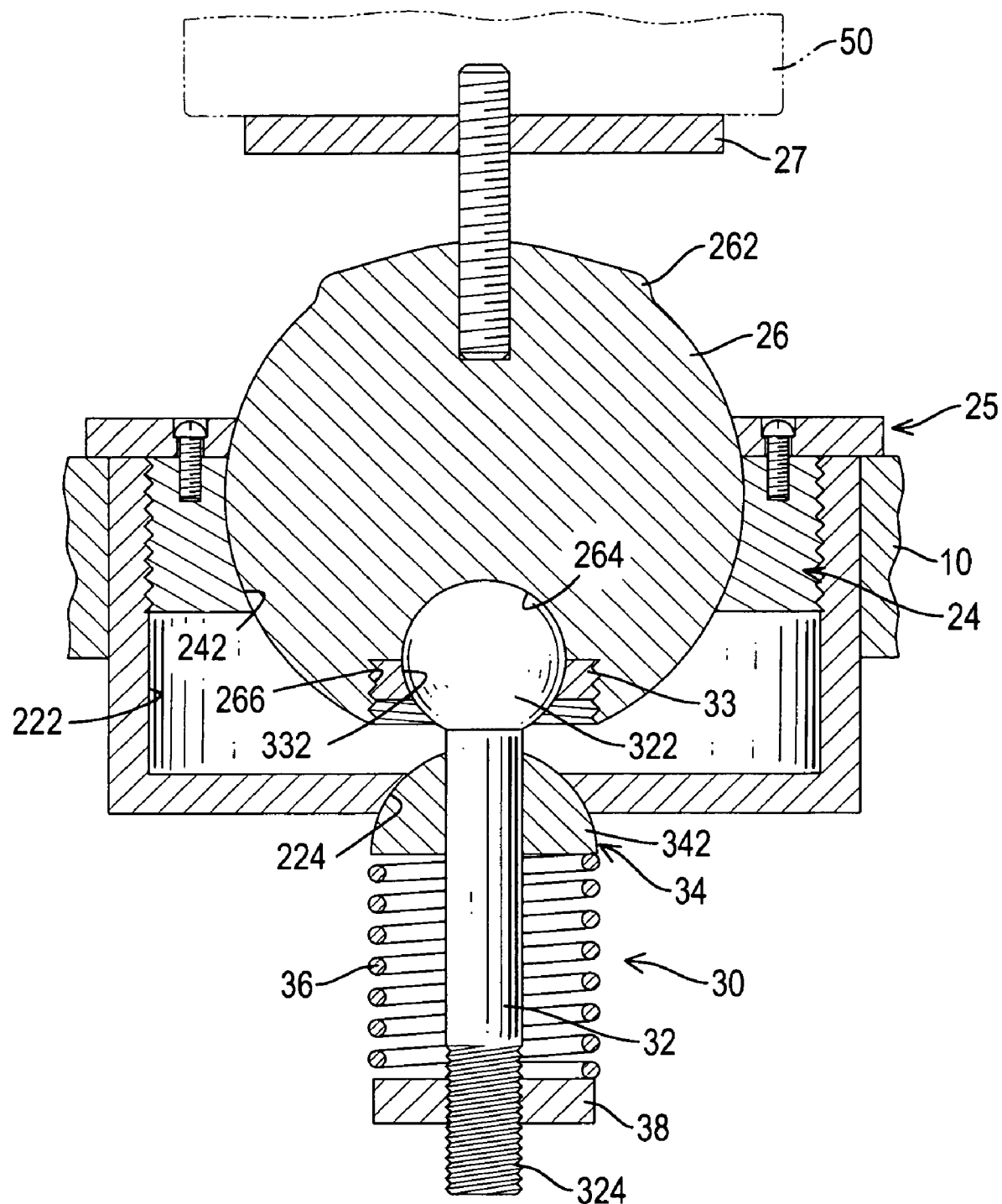
FIG. 3 is a side plan view in partial cross section of the ball head assembly in FIG. 2.

With reference to FIGS. 1 to 3, a ball head assembly (20) for a tripod, may be a conventional and marketed one, in accordance with the present invention is mounted on a supporting base (10) of the tripod and comprises a holding base (22), a clamping collar (24), a lid (25), a ball (26), a holder (27) and an anti-escape mechanism (30). The holding base (22) is securely attached to and clamped by the supporting base (10) and has a cavity (222) defined in the top of the holding base (22). A hole (224) is defined through the bottom of the holding base (22) and has a concave inner surface. A slit (226) is defined in the holding base (22) and communicates with the hole (224) to provide a slight resilient effect to the holding base (10).

The clamping collar (24) is attached to and clamped by the holding base (22) and has a concave inner surface (242). A slit (246) is defined in the clamping collar (24) to make the clamping collar (24) have a slight resilient capability.

The lid (25) is annular, is attached to the top of the clamping collar (24) and abuts with the top of the holding base (22). The lid (25) has a concave inner surface and a slit defined to make the lid (25) have a slight resilient capability.

Figure 4:
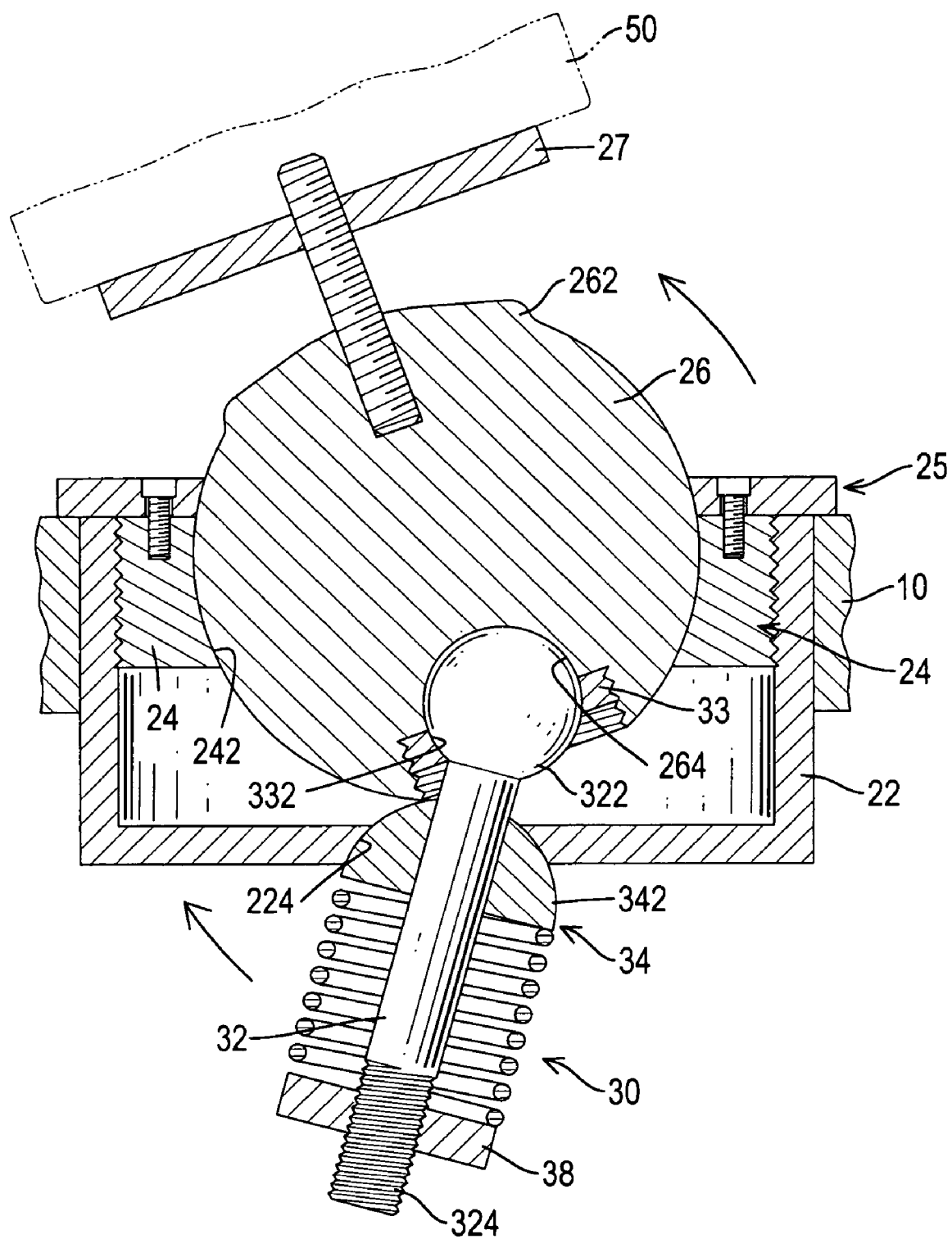
FIG. 4 is an operational side plan view in partial cross section of the ball head assembly in FIG. 2.

The ball (26) is rotatably attached to and clamped in the clamping collar (24) and rotatably mates with the concave inner surfaces (242) in the clamping collar (24) and the lid (25). The ball (26) has a protrusion (262) formed on the top and a concavity (264) defined in the bottom. The holder (27) is attached to the top of the ball (26) to hold a camera (50) on the holder (27). A positioning device is mounted on the supporting base (10) of the tripod to securely clamp the holding base (22) on the supporting base (10). With the positioning device, the holding base (22), the clamping collar (24) and the ball (26) are securely clamped by the supporting base (10), the holding base (22) and the clamping collar (24) in respective, and the horizontal level of the holder (27) on the ball (26) is maintained. When the positioning device is released, with further reference to FIG. 4, the clamping effect to the holding base (22) is released and the ball (26) can be rotated relative to the clamping collar (24) to adjust the horizontal level of the holder (26)/camera (50). The positioning device may be a conventional one and is not a subject matter of the present invention, so detailed description of the positioning device is omitted.

The anti-escape mechanism (30) is mounted on the holding base (22), is connected to the ball (26) and comprises a supporting rod (32), a hemispherical supporting block (34), a dragging member (36) and a nut (38). The supporting rod (32) extends through the hole (224) in the holding base (22) and has a spherical end (322) rotatably held inside the concavity (264) in the bottom of the ball (26) and a threaded end (324) extending out from the hole (224) in the holding base (22). To rotatably hold the spherical end (322) of the supporting rod (32) in the concavity (264), an inner thread (266) is defined in the concavity (264), and a holding nut (33) is screwed into the inner thread (266) in the concavity (264). The holding nut (33) has a central hole (332) with a concave inner surface (334) mating with the spherical end (322) of the supporting rod (32). Accordingly, the spherical end (322) of the supporting rod (32) is rotatably held between the concavity (264) and the concave inner surface (334) of the central hole (332) in the holding nut (33).

The supporting block (34) is mounted around the supporting rod (32) and has a convex surface (342) rotatably mating with the concave inner surface of the hole (224) in the bottom of the holding base (22). The dragging member (36) is mounted around the supporting rod (32), may be a spring and has a first end abutting against the supporting block (34) and a second end. The nut (38) is screwed onto the threaded end (324) of the supporting rod (32) and abuts against the second end of the dragging member (36). With such an anti-escape mechanism (30), with reference to FIGS. 3 and 4, the supporting block (34) is pushed by the dragging member (36) to abut against the inner surface of the hole (224) in the holding base (22), and a dragging and positioning effect will be provided to the ball (36) with the friction between the positioning block (34) and the inner surface of the hole (224) and the dragging/pulling effect provided by the dragging member (36). Accordingly, the ball (36) is kept from flopping down unintentionally during the operation of adjusting the horizontal level of the holder (27). That is, it is not necessary to hold or lock the camera (50) on the holder (27) during the operation of adjusting. Therefore, the use and operation of the ball head assembly (20) is convenient.

In addition, with the rotation of the ball (26), the protrusion (262) on the ball (26) will abut the lid (25) to limit the rotation range of the ball (26). This can define enough space between the ball (26) and the clamping collar (24) to keep fingers of the user from being pinched.

By changing the position of the nut (38) on the threaded end (324) of the supporting rod (32), the dragging force provided by the dragging member (36) can be changed to meet different needs.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A ball head assembly for a tripod comprising:
   a holding base having a top and a bottom;
   a clamping collar attached to the holding base;
   a ball rotatably attached to the clamping collar and having a top and a bottom;
   a holder attached to the top of the ball to hold an instrument on the holder; and
   an anti-escape mechanism mounted on the holding base, connected to the ball and comprising
      a supporting rod extending through the bottom of the holding base and having a spherical end rotatably connected to the bottom of the ball and a threaded end extending out from the bottom of the holding base;
      a supporting block mounted around the supporting rod and rotatably mating with the bottom of the holding base;
      a dragging member mounted around the supporting rod and having a first end abutting against the supporting block and a second end; and
      a nut screwed onto the threaded end of the supporting rod and abutting against the second end of the dragging member.

2. The ball head assembly as claimed in claim 1, wherein the holding base has
   a cavity defined in the top of the holding base to hold the clamping collar and the ball inside;
   a hole defined through the bottom of the holding base and having a concave inner surface; and
   a slit defined in the holding base and communicating with the hole to provide a resilient effect to the holding base; and
   the supporting block has a convex surface rotatably mating with the concave inner surface of the hole in the holding base.

3. The ball head assembly as claimed in claim 2, wherein the clamping collar has
   a top;
   a concave inner surface rotatably mating with the ball; and
   a slit defined in the clamping collar to provide the clamping collar with a resilient capability; and
   the ball head assembly further comprises an annular lid attached to the top of the clamping collar and having
   a concave inner surface rotatably mating with the ball; and
   a slit defined in the lid to provide the lid with a resilient capability.

4. The ball head assembly as claimed in claim 3, wherein the ball has
   a concavity defined in the bottom and rotatably mating with the spherical end of the supporting rod; and
   an inner thread defined in the concavity;
   a holding nut is screwed into the inner thread in the concavity and has a central hole with a concave inner surface mating with the spherical end of the supporting rod.

5. The ball head assembly as claimed in claim 4, wherein the ball has further a protrusion formed on the top.

6. The ball head assembly as claimed in claim 1, wherein the clamping collar has
   a top;
   a concave inner surface rotatably mating with the ball; and
   a slit defined in the clamping collar to provide the clamping collar with a resilient capability; and
   the ball head assembly further comprises an annular lid attached to the top of the clamping collar and having
   a concave inner surface rotatably mating with the ball; and
   a slit defined in the lid to provide the lid with a resilient capability.

7. The ball head assembly as claimed in claim 6, wherein the ball has
   a concavity defined in the bottom and rotatably mating with the spherical end of the supporting rod; and
   an inner thread defined in the concavity;
   a holding nut is screwed into the inner thread in the concavity and has a central hole with a concave inner surface mating with the spherical end of the supporting rod.

8. The ball head assembly as claimed in claim 7, wherein the ball has further a protrusion formed on the top.

9. The ball head assembly as claimed in claim 1, wherein the ball has
- a concavity defined in the bottom and rotatably mating with the spherical end of the supporting rod; and
- an inner thread defined in the concavity;
- a holding nut is screwed into the inner thread in the concavity and has a central hole with a concave inner surface mating with the spherical end of the supporting rod.

10. The ball head assembly as claimed in claim 9, wherein the ball has further a protrusion formed on the top.

11. The ball head assembly as claimed in claim 1, wherein the ball has a protrusion formed on the top.

\* \* \* \* \*